March 12, 1957 F. V. THOMAS 2,784,750
COMBINATION MITER GUIDE AND SELF-REVERSING
RADIAL SAW APPARATUS
Filed Sept. 2, 1955 4 Sheets-Sheet 1

INVENTOR.
FRANCIS V. THOMAS
BY
*McMorrow, Berman + Davidson*
ATTORNEYS

March 12, 1957 F. V. THOMAS 2,784,750
COMBINATION MITER GUIDE AND SELF-REVERSING
RADIAL SAW APPARATUS
Filed Sept. 2, 1955 4 Sheets-Sheet 2

INVENTOR.
FRANCIS V. THOMAS
BY
McMorrow, Berman & Davidson
ATTORNEYS

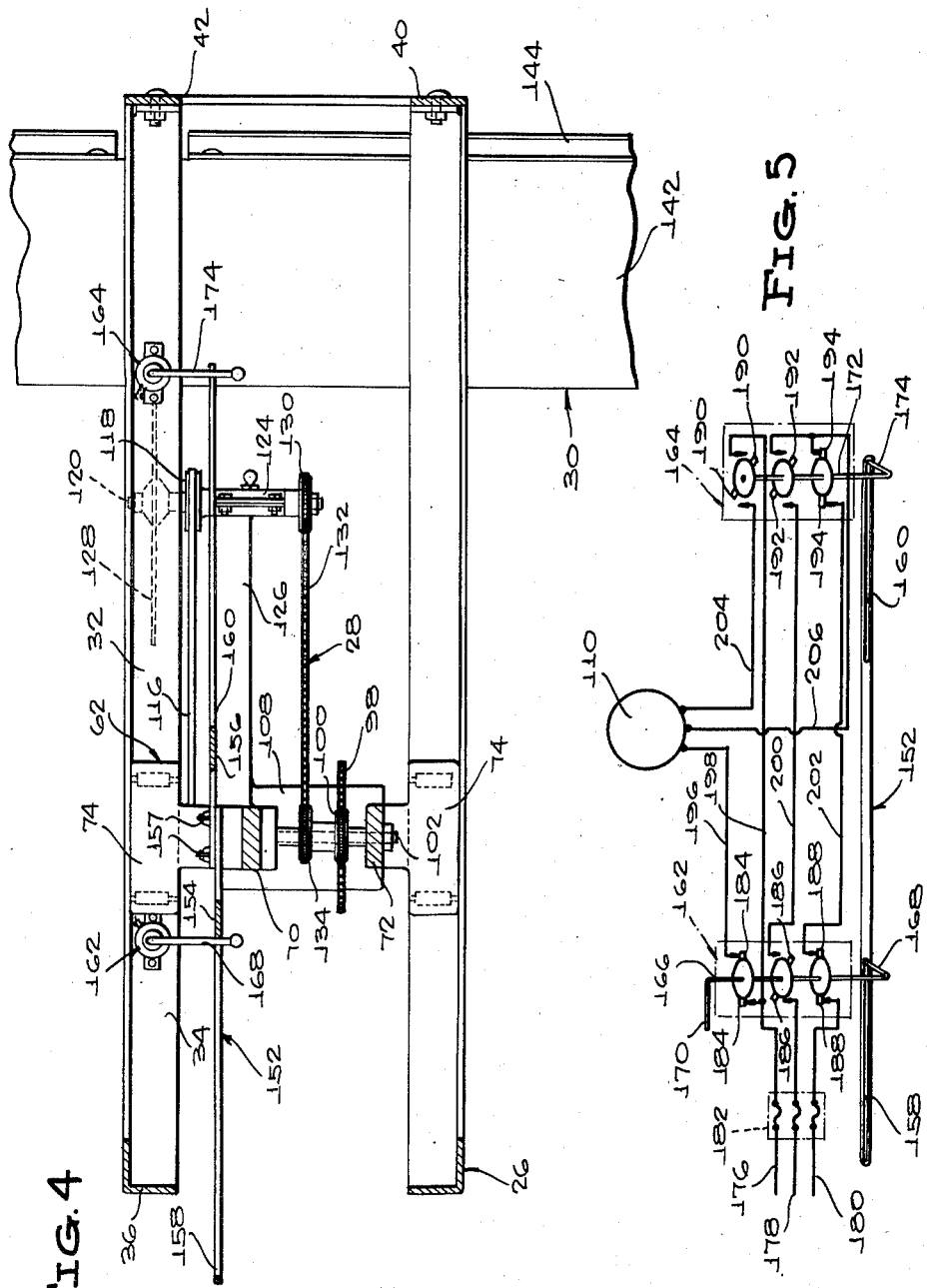

United States Patent Office 2,784,750
Patented Mar. 12, 1957

2,784,750

COMBINATION MITER GUIDE AND SELF-REVERSING RADIAL SAW APPARATUS

Francis V. Thomas, Easley, S. C.

Application September 2, 1955, Serial No. 532,314

4 Claims. (Cl. 143—47)

This invention relates to sawing machines in general, and in particular to what may be appropriately termed a combination miter guide or "box," and power saw so designed as to mount a rotary saw blade for travel in a radial direction toward and away from an unchanging center, following location of said saw at a selected, adjusted point upon an arc struck about said center.

Summarized briefly, the invention constitutes an apparatus wherein a carriage housing is horizontally swingable about a pivot axis located upon a degree-marked support for said housing, with the pivotal adjustment of the housing being selected according to the angle at which a piece of lumber is to be cut. The housing is provided with a trackway, on which is rollably mounted a carriage, which is adapted to travel toward and away from the center about which the housing swings, following adjustment of the housing to the desired angular relationship relative to the work. Mounted upon the carriage is an electric motor, driving a rotary blade, and accordingly, when the carriage moves toward and away from the pivot axis of the housing, said blade is adapted to make a cut through a piece of work supported upon a table that extends across the path of movement of the carriage.

When the motor is in operation, it not only drives the saw, but has a driving connection with the carriage itself, that effects the movement of the carriage toward the work. Switch means is provided, at opposite ends of the path of travel of the carriage, actuated by the carriage as the carriage reaches the extreme limit of its travel in one direction, and on movement of the carriage toward the work, one of said switch means is operated by the carriage following the traverse of the work piece by the saw, to effect a reversing of the motor, causing a reversal of the direction of the movement of the carriage, as well as a reversal of the direction of rotation of the saw blade. As a result, the carriage moves within the housing in a direction away from the work, with the saw moving out of the cut. On movement of the carriage to the opposite extreme limit of its level, that is, back to its start or rest position, the other switch means is actuated thereby to stop operation of the motor.

By reason of the above, it will be seen that the apparatus is one which permits adjustment of the carriage and housing as desired, to permit cutting of the work at a selected angle relative to the length of the work piece, and it will further be noted that once the position of the housing has been fixed in this manner, the device, each time the motor is placed in operation, will travel toward the work to make a cut therethrough, and will reverse itself to return to its start position, with the reversal of the direction of movement of the carriage, and the stopping of the motor, being effected automatically, to await removal of the piece and insertion of a new work piece to be cut at the same or a different angle.

The main object of the present invention can be appropriately stated as being the provision of apparatus of the type stated which will effect the desired cutting of pieces of lumber at a selected angle, in far less time, and with far less attention so far as the worker is concerned, than has heretofore been possible with other sawing machines and/or miter guides previously devised. Due to the self reversing action of the carriage, the self propulsion of the sawing mechanism toward and away from the work, and the automatic stopping of the mechanism following the cutting of each work piece, the worker or workers tending the machine can limit their entire duties to the throwing of the switch each time a new piece of lumber is to be cut, the removal of a work piece following cutting of the same, and the insertion of a new work piece. This is distinguished from prior devices in the art, wherein, for example, miter guides have been provided so designed as to make necessary the manual shifting of the saw toward and away from the work. In view of the added necessity of removing a cut piece of lumber and placing a new piece on the table, this has invloved an excessive number of workers, as well as the consumption of an excessive amount of time during the cutting of each piece.

A further object of importance, in this regard, is to provide apparatus of the type stated having improved means for cushioning the carriage against undue shocks at opposite limits of the travel, with said means having the further desirable characteristic of giving a slight impetus to the carriage in a return direction, thus to relieve the reversing motor of undue strain that would otherwise be imposed thereon when the motor is beginning to drive the carriage from a stop position, at either extreme limit of the travel of the carriage.

Another object of importance is to provide an improved construction in an apparatus of the type referred to, wherein the table can be swiftly adjusted for selected heights, and wherein, further, the table can be extended to accommodate longer pieces of work.

Still another object is to provide means insuring the retention of the carriage housing in each position to which the same is angularly adjusted relative to the length of the work piece.

Other objects will appear from the following description, the claims appended thereto, and from the annexed drawing, in which like reference characters designate like parts throughout the several views, and wherein:

Figure 4 is a horizontal section through the housing, on line 4—4 of Figure 2; and Figure 5 is a wiring diagram showing the circuity of the apparatus.

The apparatus constituting the present invention includes a stationary, elevated support, said support being of table-like construction and including a horizontally disposed support plate 10 mounted upon downwardly diverging front legs 12, and a vertical rear leg 14. Thus, the horizontal plate 10, as shown to best advantage in Figure 1, at opposite sides of the front portion thereof is secured to the legs 12, and at its rear end is secured medially between opposite sides thereof to the vertical leg 14. The horizontal support plate thus has a three point support, providing a secure, firm support for the remaining parts of the apparatus, all of which are carried by the plate 10.

Figure 1:
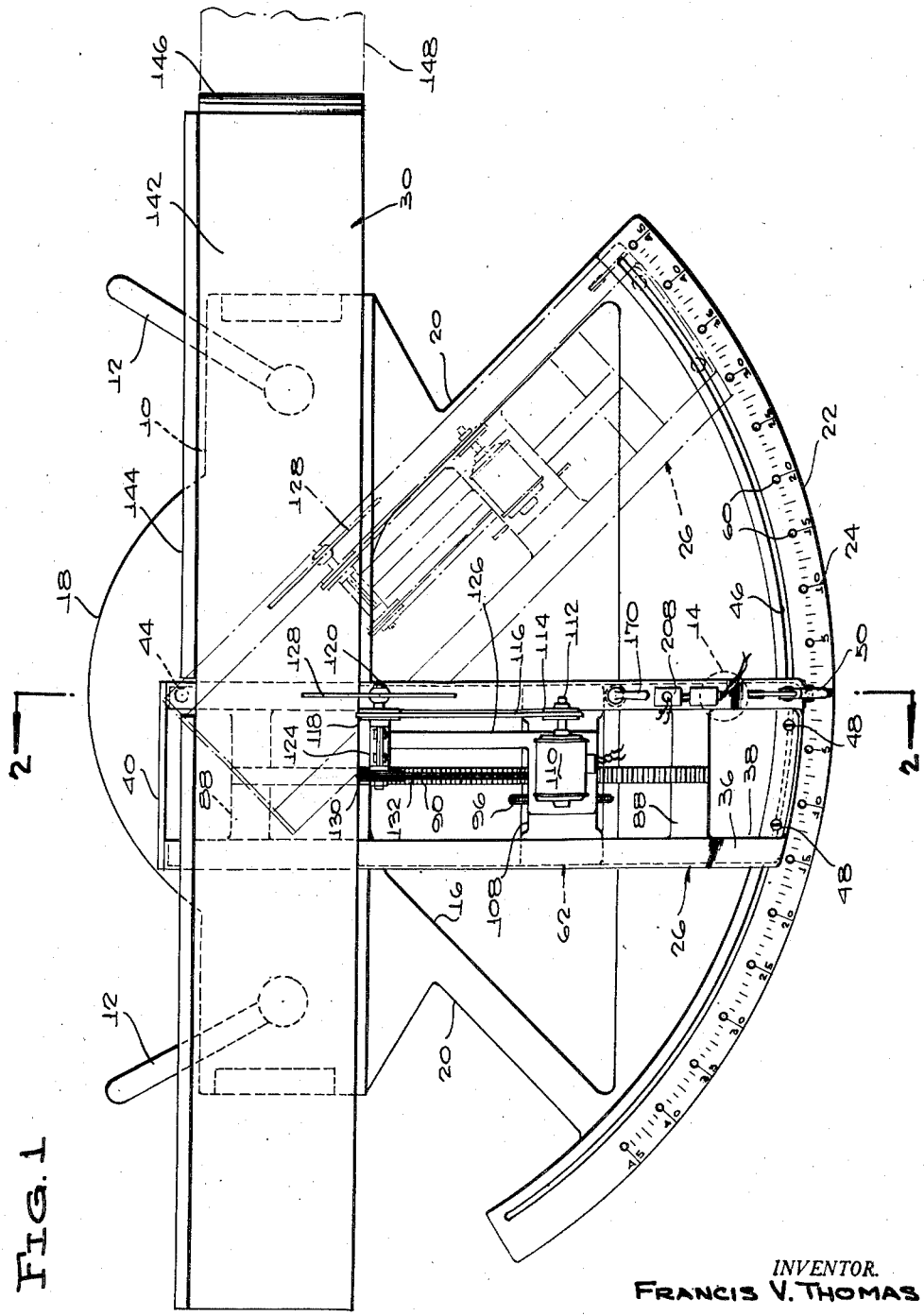
Figure 1 is a top plan view of an apparatus formed in accordance with the present invention, the housing and carriage being shown in full lines in position to make a cut through a work piece perpendicular to the longitudinal center line of said teeth, and the dotted lines showing the housing in another position of angular adjustment wherein the blade will make an oblique cut across the work piece.

Referring to Figure 1, the plate 10 is formed with a substantially centrally disposed, large opening 16 having side edges converging in the direction of the front end of the plate, and having parallel front and rear edges. At the front end of plate 10, the plate is formed with a rounded extension 18. At its opposite sides, the plate is provided with large, angular recesses 20, and the rear end edge of the plate is curved to provide an arcuate protractor segment 22. A degree-marked scale 24 is provided upon segment 22, said scale including a zero marking medially between its opposite ends, the scale being marked in ascending order of value in opposite directions from the zero marking, up to 45 degrees. Obviously, the scale can be extended as necessary, to provide indicia above a value of 45 degrees.

Figure 2:
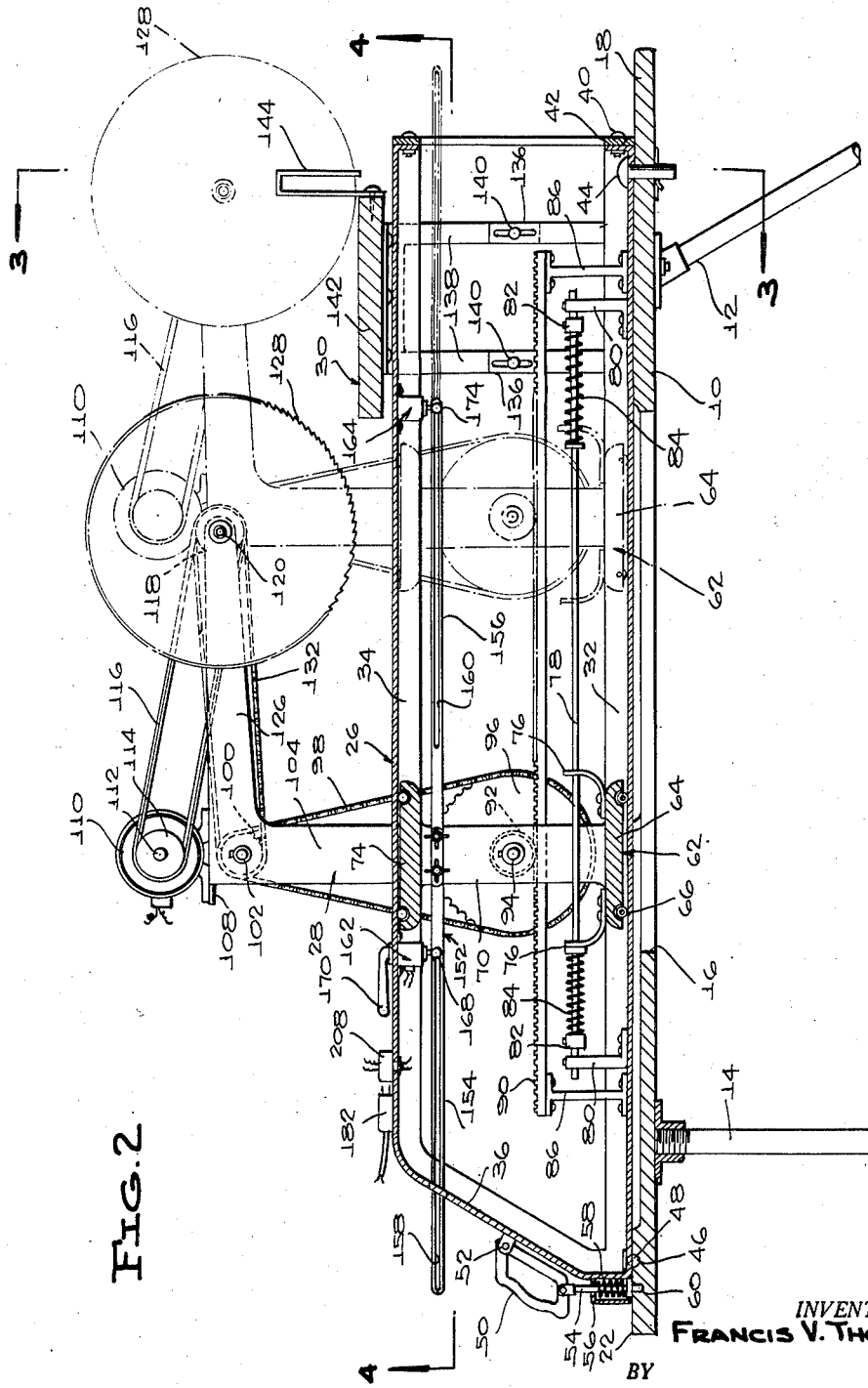
Figure 2 is an enlarged vertical sectional view through the device, showing the housing in longitudinal section, said view being taken on line 2—2 of Figure 1.

Supported upon the plate 10 is an elongated carriage housing generally designated at 26, and this is swingably adjustable about a vertical axis that constitutes the center of the arc defined by the protractor segment. Rollably mounted upon the housing, to travel longitudinally of the housing in a radial direction in respect to the pivot axis of the housing, is a self propelled and self reversing sawing mechanism generally designated at 28. The sawing mechanism carries a rotary blade which, as shown in full and dotted lines in Figure 2, is adapted to traverse a work piece support table generally designated at 30 and also mounted upon the plate 10, said table extending over the forward end of the housing 26.

Figure 3:
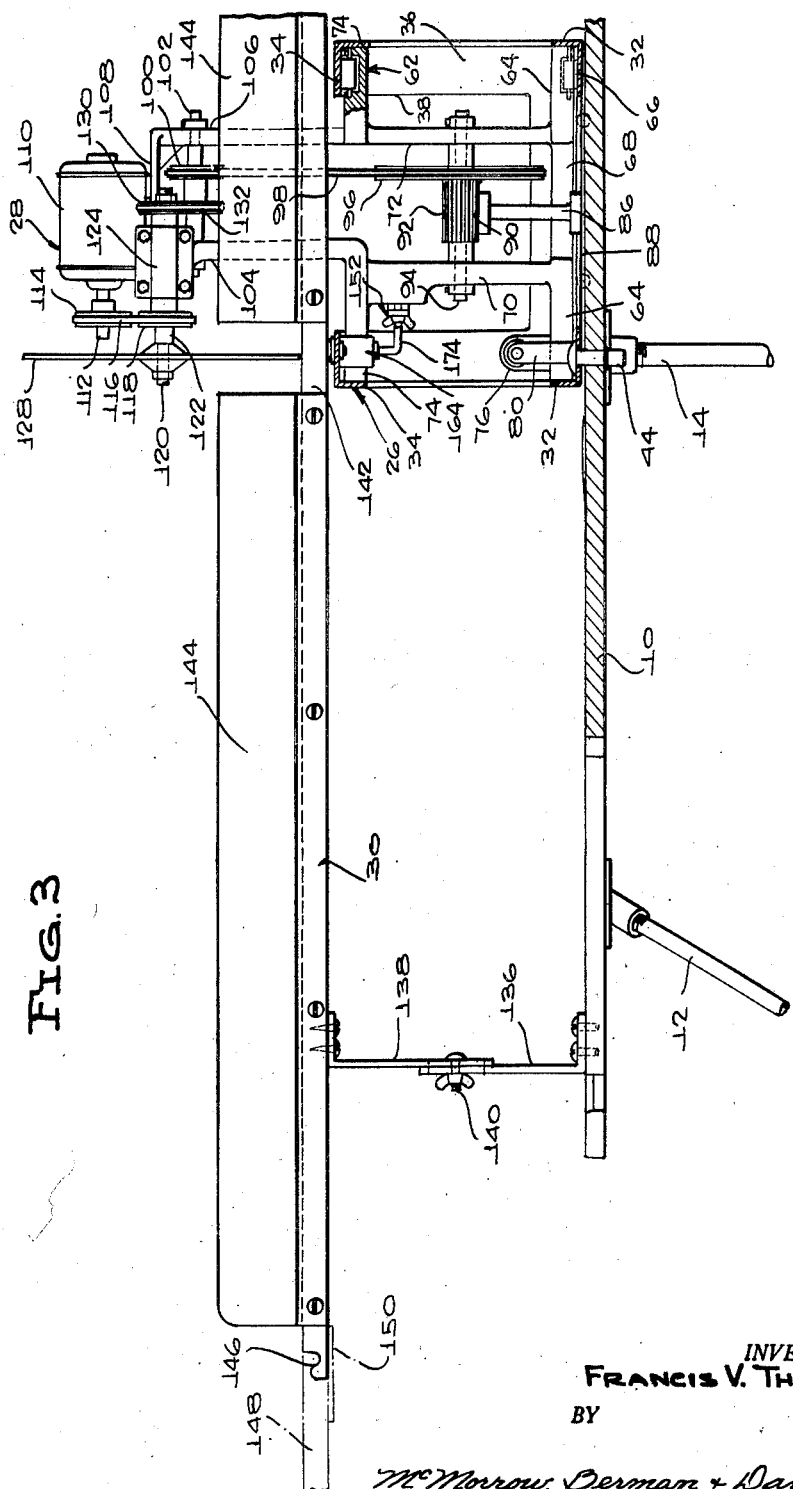
Figure 3 is a sectional view on line 3—3 of Figure 2, the housing being shown in cross section.

Considering first the particular construction of the housing, this is formed as a metal frame, open at its sides, front, bottom, and rear end. The housing includes lower, straight, parallel side rails 32, supported directly upon the top surface of the plate 10 and sliding over said top surface during the aforementioned pivotal adjustment of the housing about its vertical axis. Referring to Figure 3, spaced vertically of the respective lower side rails 32 are upper side rails 34, also extended in parallel relation in a horizontal plane. The upper side rails, at their rear ends (that is, the ends shown at the left in Figure 2) merge into inclined extensions 36, integrally connected between the respective upper and lower side rails of the housing, at each side of the housing. The extensions 36 of the top rails define between them a rear end opening 38 (see Figure 3) of the housing.

By reason of this arrangement, it is seen that the housing is open at its top, sides, and rear end, thus to afford full visibility of the mechanism confined within the housing, to permit immediate perception of any faulty operation that may develop while the apparatus is running.

At the front end of the housing, there is provided a rectangular front end frame 40, secured to the front ends of the several side rails 32, 34 and defining a front end opening 42 in the housing.

Extending vertically through one of the side rails 32, in closely spaced relation to the forward extremity of said side rail, is a pivot bolt 44 (see Figures 1 and 2), said pivot bolt extending through an opening provided in the extension 18 of the support plate 10 and mounting the housing for horizontal pivotal adjustment upon the plate, to locate the housing in selected positions upon the plate, as for example, the full and dotted line positions shown in Figure 1.

Formed in the top surface of the protractor segment 22 of plate 10 is an elongated, arcuate groove 46 extending the full length of the scale 24, and extending, in fact, as shown in Figure 1, beyond one end of the scale to permit the side of the housing through which the pivot bolt 44 extends to be registered with any of the degree indicia of said scale. Groove 46, as shown in Figure 2, constitutes a guide groove, receiving a depending, rounded lug 48 carried by the free end of the housing, and said lug is so proportioned as to elevate the underside of the housing above the top surface of the support plate 10 just sufficiently to reduce frictional contact between the housing and support plate to a minimum.

Means is provided for locking the housing in selected positions to which it is pivotally adjusted about its axis, and is shown to particular advantage in Figure 2. Said means is in the form of a detent, including a handle 50 pivoted at 52 upon the rear end of the housing, at the same side of the housing as that through which the pivot bolt 44 extends (see Figure 1). Handle 50 is pivotally connected, at its lower end, to the upper end of a vertically shiftable detent rod 54, slidable in a detent rod housing 56, in which is confined a spring 58. Spring 58 is circumposed about rod 54, and at its upper end abuts against the upper end wall of the detent housing 56. At its lower end, the spring abuts against a collar secured fixedly to the rod 54, and hence, spring 58, whenever free to expand, urges rod 54 downwardly for engagement of the lower end of the rod in a selected opening 60 provided in the protractor segment 22.

Referring to Figure 1, the openings 60 occur at five degree intervals of the scale 24, but it will be understood that openings could be provided at more frequent intervals if desired, and could, in fact, be located at each individual degree marking of the scale.

By reason of the construction so far illustrated and described, it will be observed that by lifting the handle 50, the detent is disengaged from a recess 60 of the protractor segment, and the housing, with the handle held in elevated position, can now be pivotally swung about the axis defined by pivot bolt 44, to locate the rod 54 above a selected recess 60. When the housing has been adjusted to its new position, the handle is released, and spring 58 will expand, to lock the housing in the selected position of horizontally swingable adjustment thereof.

Referring now to the sawing mechanism mounted for rolling movement within the housing, this includes a carriage generally designated at 62.

The carriage 62 is in rollable engagement with all four of the rails 32, 34. The lower end of the carriage, that is rollably supported upon the respective rails 32, includes roller support members 64, on which are rotatably mounted rollers 66 in engagement with the respective lower rails 32. The members 64 are integrally connected by a cross bar 68 (Figure 3), and also integral with the respective members 64 are transversely spaced, vertical bearing posts 70, 72. These are integral at their upper ends with upper roller support members 74, equipped with rollers on their top surfaces in engagement with the upper side rails 34.

The carriage is thus mounted for rolling movement within the housing, in a direction longitudinally of the housing, and travels between the opposite extreme positions shown in full and dotted lines in Figure 2.

Means is provided in the housing for cushioning the stopping of the carriage at the opposite extreme limits of its travel, and for imparting a slight impetus thereto, tending to initiate the return movement of the carriage. Said means has been shown to particular advantage in Figure 2. As shown in this figure of the drawings, secured to and projecting upwardly from the member 64 at one side of the carriage are bumpers 76, 76, having openings aligned with one another in the direction of carriage movement. Extending through said openings is a rod 78, the ends of which are secured to brackets 80 attached to and projecting upwardly from the adjacent lower side rail 32, at locations near the opposite ends of said side rails.

Collars 82 are secured to the opposite end portions of the rod 78, and can be adjusted to selected locations along the length of the rod, at which locations the collars are fixed by means of set screws or equivalent means, threaded into engagement with the rods. Abutting at their outer ends against the respective collars are compression springs 84, the other ends of which are engaged with washers freely slidable upon rod 78. The adjustment of the collars 82, as will be appreciated, permits the adjustable positioning of the springs 84 along the length of the rod 78.

When the carriage travels toward the left in Figure 2, ultimately the bumper 76 shown at the left in this figure of the drawings will engage the washer of the left hand spring 84, and the spring will be placed under compression, absorbing the shock of stopping the carriage, and imparting an initial movement to the carriage in a return direction. Similarly, when the carriage is at the other extreme limit of its travel shown in dotted lines in Figure 2, the other spring 84 compresses in the same manner, to initiate return movement to the carriage while at the same time taking up the shock as the carriage is brought to a halt preliminary to reversal of the direction of movement thereof.

Extending longitudinally and centrally of the housing is a stationary rack assembly, and this includes upstanding support brackets 86 disposed in adjacent opposite ends of the housing as shown in Figure 2, said brackets being mounted upon cross bars 88 connected between the lower side rails 32 (Figure 1).

Fixedly attached at its opposite ends to the respective brackets 86 is an elongated, horizontally disposed rack 90, the teeth of which are faced upwardly in mesh with a pinion 92 rotatably mounted upon a shaft 94 connected between the posts 70, 72 (see Figure 3). Pinion 92 is integral with or otherwise fixedly secured to a large sprocket 96, about which is trained a chain 98 trained also about a small sprocket 100 mounted upon a shaft 102 connected between the upper end portions of upstanding, transversely spaced extension posts 104, 106 (see Figure 3) of the carriage.

The posts 104, 106 extend a substantial distance above the top surface of the housing, in the space between the upper side rails 34, and at their upper ends are integral with a motor support plate or ledge 108, on which is mounted an electric motor 110.

To the shaft 112 of the motor 110 there is secured a drive pulley 114, about which is trained a belt 116 rotating a driven pulley 118 secured to and turning a saw blade shaft 120 turning in a bearing sleeve 122 (Figure 3) secured within a clamp 124 mounted upon the forward or free end of an arm 126. The arm 126, as shown in Figure 2, constitutes a forward extension of the upper end of the extension post 104.

Connected to the shaft 120 for rotation thereby is a rotary saw blade 128 rotating in a plane aligned radially with the pivot axis about which the housing 26 is horizontally swingable (see Figure 1). By reason of this arrangement, it will be seen that when the carriage is moved toward the front end of the housing, the blade 128 travels radially of the protractor segment 22, toward the center about which the scale 24 is curved.

Also secured to the shaft 120 for rotation therewith is a small sprocket 130, about which is passed a chain 132, meshed with a sprocket 134 (Figure 4) secured to the shaft 102.

By reason of this arrangement, it will be seen that when the motor is placed in operation, it will rotate the saw blade 128, and at the same time, will cause the carriage to move longitudinally of the housing, the direction of movement of the carriage depending upon the direction in which the shaft of the motor is turning. The movement of the carriage is accomplished by driving of the sprocket 130 through the medium of the blade shaft 120, the rotation of the sprocket 130 being effective to transmit rotation to the sprocket 100, which in turn causes rotation of pinion 92 by reason of the sprocket and chain driving connection 96, 98, 100. When pinion 92 rotates, it effects the movement of the carriage longitudinally of the housing by reason of its meshing with the rack 90.

Referring now to the particular description of the work piece support table 30, this includes support brackets of adjustable height, mounted upon the opposite sides of the plate 10, adjacent the legs 12. The brackets, as shown in Figures 2 and 3, include upstanding bracket members 136, a pair of said members being provided at each side of the plate 10. The members 136 are slotted at their upper ends, and are connected to the lower ends of bracket members 138 by means of bolts and wing nuts 140. By reason of this arrangement, the members 138 can be adjusted upwardly or downwardly as the case may be, and are secured in the selected position of adjustment by turning the wing nuts home upon their associated bolts.

Members 138 are secured to the underside of a horizontally disposed, elongated table 142, the intermediate portion of which extends over the housing 26. Secured to and projecting upwardly from the forward longitudinal edge of the table 142 are stops 144, formed from lengths of sheet metal bent substantially into an inverted U-shape when seen in cross section. The stops 144 together extend the full length of the table 142, except for a small space which is left intermediate opposite ends of the table as shown in Figure 3, to permit movement of the saw blade past the forward edge of the table.

A work piece, not shown, such as a length of lumber in which a transverse curve is to be made, is positioned upon the table, with one longitudinal edge of the work piece in engagement with the stop 144, after which the carriage moves from the full to the dotted line position in Figure 2 to make the transverse cut through said member.

If desired, for handling work pieces of greater than normal length, the table can be extended. To this end, the table is formed at one end with a grooved extension 146, adapted to receive a complementarily grooved end of an extension table 148, the extension table having a bottom plate 150 engaging under the extension 146 as shown in Figure 3.

The invention includes means to effect the automatic reversal of the carriage movement each time a cut through the work piece is completed, and also the stopping of the motor when the carriage returns to its initial position shown in full lines in Figure 2. Said means is illustrated to best advantage in Figures 2, 4, and 5 and includes an elongated, horizontally disposed switch arm actuating bar generally designated at 152. Bar 152 is sectionally constituted, and comprises a first bar section 154 and a second bar section 156. These are overlapped at their inner ends as shown in Figure 4, and are secured by bolts and wing nuts 157 to the adjacent side of the carriage posts 70.

Formed in the sections 154, 156 are elongated, closed slots 158, 160 respectively, which, as will presently appear, effect swinging movement of switch arms extending from a main control switch generally designated 162, and a carriage reversing switch 164.

The switches are secured to the underside of one of the upper side rails 34, and are formed as shown in Figure 5. The switch 162 includes a vertically disposed shaft 166 the lower end of which is formed with a lateral extension or arm 168 extending through slot 158. At its upper end, shaft 166 is provided with a lateral extension 170 constituting a handle which can be grasped by a user for the purpose of manually operating the switch 162.

Switch 164 is provided with a vertical shaft 172 having a lateral extension 174 at its lower end engaged in slot 160, but is not equipped at its upper end with a handle.

Extending from a suitable source of electricity are leads 176, 178, 180 (Figure 5) said leads extending through a fuse box 182 (Figure 2) mounted upon the housing 30. Switch 162 is provided with vertically spaced sets of diametrically opposed contacts 184, 186, 188, one contact of each set being connected to the leads 176, 178, 180 respectively.

Switch 164 is also provided with three vertically spaced sets of diametrically opposed contacts 190, 192, 194. Connected between one terminal of the reversing motor 110 and the other contact 184 is a lead 196. Connected between the first named contact 184, that is the contact connected to lead 176, and one of the contacts 190 of switch 164, is a lead 198. A lead 200 is connected between the other contact 186 and one of the contacts 192, while a lead 202 is similarly connected between one of the contacts 188 and one of the contacts 194.

Connected with the other contacts 192, 194 is a lead 206 extending to a second terminal of the motor 110, while a lead 204 is connected between the other contact 190 and a third terminal of the motor.

A junction box 208 (Figures 1 and 2) would be used between fuse box 182 and switch 162 through which leads 176, 178, 180 would be extended, for making a suitable connection between the wiring that extends between the switches and motor, and the source of electric power.

When the carriage is at its rest or start position shown in full lines in Figure 2, all the contacts of switch 162 would be out of engagement with the contacts carried by the leads extending to and from the switch 162. As a result, the motor will not receive current, and the device will not operate.

At this time, the arm 174 is at the front end of slot 160 as shown in Figure 5, with the several contacts 190, 192, 194 being positioned as shown, that is, switch contacts 190 are open as are the contacts 192, but switch contacts 194 are closed.

Now, to initiate operation of the apparatus, the worker turns handle 170, to an extent that will close contacts 184, and 188, while contacts 186 will still be open. This is due to the fact that the contacts 186 are offset slightly circumferentially of the switch 162 as shown in Figure 5.

Under these circumstances, current will flow through lead 176, through the closed switch contacts 184, and lead 196 to the motor, and energizing the motor, will flow back to the source of power through lead 206, closed contacts 194, lead 202, closed contacts 188, and lead 180.

The motor will now be in operation, and its shaft will rotate in a direction to advance the carriage to the dotted line position in Figure 2. As a result, a cut is made through the work, it being understood that said cut would be at any desired angle to the length of the work, said angle being set by previous positioning of the housing 26 at a selected location upon the protractor segment.

When the carriage reaches the forward limit of its travel, the inner end wall of the slot 160 will engage 174, and will, accordingly, rotate shaft 172. The shaft 172 is rotated to an extent sufficient to open contacts 194, and to close contacts 190 and 192.

At the same time, the outer end of slot 158, that is, the end shown at the left in Figure 5, engages arm 168, and opens contacts 188, and 184, while closing contacts 186.

Current will now flow through lead 178, closed contacts 186, lead 200, closed contacts 192, and lead 206 to the motor, and will flow out through lead 204, closed contacts 190, lead 198, and lead 176.

This causes reversing of the motor, and as a result, the carriage begins movement back to its starting position. The initial impetus to impart return movement to the carriage is given by the spring 84 shown at the right in Figure 2, which will be placed under compression simultaneously with swinging of the switch arms 168, 174.

When the carriage returns to its initial position, arm 168 is engaged by the inner end of slot 158, while arm 174 is engaged by the outer end of slot 160. The arm 168 is swung to an extent sufficient to completely open all the contacts of switch 162, thus stopping the operation of the motor. Arm 174 is swung to an extent sufficient to change the position of the switch contacts of switch 164, said contacts being now once again in their Figure 5 position, awaiting the next use.

Due to the arrangement illustrated and described, each time a piece of lumber is cut, it can be swiftly removed and a new piece placed upon the table 30, and this can be done immediately following the beginning of movement of the carriage back to its starting position. When the carriage arrives at its starting position, a new piece of lumber will be in place, and the switch handle 170 is again thrown to permit the new piece to be cut, by repetition of the cycle of operation hereinbefore described.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A combination sawing machine and miter guide comprising a stationary support; a work piece support table carried by said support; a carriage housing mounted upon said support for adjustment to selected positions of angularity relative to the length of said table; a carriage mounted upon the housing for movement toward and away from the table in each position of adjustment of the housing; a motor of the reversing type mounted on the carriage; a sawing mechanism carried by said carriage and driven by said motor for making a cut in a work piece supported on the table responsive to the movement of the carriage toward the table; means connecting said carriage to said housing and to said motor so as to drive the carriage in its movement both toward and away from said table; and switch means in circuit with the motor mounted on the carriage housing at opposite extreme limits of the travel of the carriage, said switch means being arranged to be tripped by the carriage, one of said switch means being adapted to de-energize the motor following a single cycle of movement of the carriage toward and away from the table and the other switch means being adapted to reverse the motor midway during said cycle to impart return movement to the carriage following the making of a cut through a work piece supported on the table.

2. A combination sawing machine and miter guide comprising a stationary support having a curved scale thereon marked in degrees; an elongated work piece support table mounted upon said support; a carriage housing extending under the table and mounted upon the support for pivotal adjustment about a vertical axis disposed as the center about which said scale is curved, said housing being pivotally adjustable to selected positions of angularity relative to the length of said table; a carriage mounted upon the housing for movement toward and away from the table in each position of adjustment of the housing; a motor of the reversing type mounted on the carriage; a saw blade driven by the motor and mounted upon the carriage, for making a cut in a work piece supported on the table responsive to movement of the carriage toward the table; means connecting said carriage to said housing and to said motor so as to drive the carriage in its movement both toward and away from said table; and switch means in circuit with the motor mounted on the carriage housing at opposite extreme limits of the travel of the carriage, said switch means being arranged to be tripped by the carriage, one of said switch means being adapted to de-energize the motor following a single cycle of movement of the carriage toward and away from the table and the other switch means being adapted to reverse the motor midway during said cycle to impart return movement to the carriage following the making of a cut through a work piece supported on the table.

3. A combination sawing machine and miter guide comprising a stationary support having a curved scale thereon marked in degrees; an elongated work piece support table mounted upon said support; a carriage housing extending under the table and mounted upon the support for pivotal adjustment about a vertical axis disposed as the center about which said scale is curved, said housing being pivotally adjustable to selected positions of angularity relative to the length of said table; a carriage mounted upon the housing for movement toward and away from the table in each position of adjustment of the housing; a motor mounted on the carriage; a saw blade driven by the motor and mounted upon the carriage, for making a cut in a work piece supported on the table responsive to movement of the carriage toward the table; a rack and pinion on the housing and carriage respectively, arranged to effect said movement of the carriage responsive to rotation of the pinion; a driving connection between the motor and pinion, said motor being of the reversing type, so as to drive the carriage in its movement both toward and away from said table; and switch means in circuit with the motor mounted on the carriage housing at opposite extreme limits of the travel of the carriage, said switch means being arranged to be tripped by the carriage, one of said switch means being adapted to de-energize the motor following a single cycle of movement of the carriage toward and away from the table and the other switch means being adapted to reverse the motor midway during said cycle to impart return movement to the carriage following the making of a cut through a work piece supported on the table.

4. A combination sawing machine and miter guide comprising a stationary support having a curved scale thereon marked in degrees; an elongated work piece support table mounted upon said support; a carriage housing extending under the table and mounted upon the support for pivotal adjustment about a vertical axis disposed as the center about which said scale is curved, said housing being pivotally adjustable to selected positions of angularity relative to the length of said table; a carriage mounted upon the housing for movement toward and away from the table in each position of adjustment of the housing; a motor mounted on the carriage; a saw blade driven by the motor and mounted upon the carriage, for making a cut in a work piece supported on the table responsive to movement of the carriage toward the table; a rack and pinion on the housing and carriage respectively, arranged to effect said movement of the carriage responsive to rotation of the pinion; a driving connection between the motor and pinion, said motor being of the reversing type, so as to drive the carriage in its movement both toward and away from said table; switch means in circuit with the motor mounted on the carriage housing at opposite extreme limits of the travel of the carriage, said switch means being arranged to be tripped by the carriage, one of said switch means being adapted to de-energize the motor following a single cycle of movement of the carriage toward and away from the table and the other switch means being adapted to reverse the motor midway during said cycle to impart return movement to the carriage following the making of a cut through a work piece supported on the table; and shock absorber means disposed at opposite ends of the travel of the carriage arranged to provide resilient, yielding stops engaging the carriage at the extreme limits of its travel, the carriage engaging said stops simultaneously with tripping of the switches, said stops being adapted to impart an initial impetus to the carriage on changing of the direction of movement of the carriage.

References Cited in the file of this patent

UNITED STATES PATENTS

| | | |
|---|---|---|
| 400,707 | Perkins | Apr. 2, 1889 |
| 1,628,845 | Jackson | May 17, 1927 |
| 1,646,589 | Meek et al. | Oct. 25, 1927 |
| 1,828,043 | Hedgpeth | Oct. 20, 1931 |
| 2,435,765 | Anderson | Feb. 10, 1948 |
| 2,559,283 | Dick | July 3, 1951 |
| 2,595,322 | Avery | May 6, 1952 |
| 2,633,162 | Neuenschwander | Mar. 31, 1953 |